United States Patent
Misu et al.

(10) Patent No.: US 12,367,773 B2
(45) Date of Patent: Jul. 22, 2025

(54) CONTROL SYSTEM, CONTROL METHOD, AND STORAGE MEDIUM FOR STORING PROGRAM TO CONTROL THE OPERATION OF A MOBILE DEVICE

(71) Applicant: HONDA MOTOR CO., LTD., Tokyo (JP)

(72) Inventors: Teruhisa Misu, San Jose, CA (US); Kentaro Yamada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 507 days.

(21) Appl. No.: 17/703,577

(22) Filed: Mar. 24, 2022

(65) Prior Publication Data

US 2023/0326348 A1 Oct. 12, 2023

(51) Int. Cl.
| G06Q 30/0207 | (2023.01) |
| B60W 60/00 | (2020.01) |
| G06Q 50/40 | (2024.01) |
| G06V 20/56 | (2022.01) |
| G08G 1/00 | (2006.01) |

(Continued)

(52) U.S. Cl.
CPC ....... *G08G 1/202* (2013.01); *B60W 60/00253* (2020.02); *G06Q 30/0207* (2013.01); *G06Q 50/40* (2024.01); *G06V 20/56* (2022.01); *G10L 15/22* (2013.01); *H04W 4/40* (2018.02); *B60W 2420/403* (2013.01); *B60W 2540/041* (2020.02); *B60W 2540/21* (2020.02); *B60W 2556/45* (2020.02); *G10L 2015/225* (2013.01); *G10L 2015/228* (2013.01)

(58) Field of Classification Search
CPC .. G08G 1/202; H04W 4/40; B60W 60/00253; B60W 2540/21; B60W 2540/041; B60W 2556/45; B60W 2420/403; G06V 20/56; G06Q 50/40; G06Q 30/0207; G10L 15/22; G10L 2015/225; G10L 2015/228
See application file for complete search history.

(56) References Cited

U.S. PATENT DOCUMENTS 10,522,145 B2　12/2019　Ogawa
2007/0150175 A1*　6/2007　Shen ................. G01C 21/3647
　　　　　　　　　　　　　　　　　　　701/438

(Continued)

FOREIGN PATENT DOCUMENTS

JP　2017-156511 A　9/2017

*Primary Examiner* — Scott A Browne
*Assistant Examiner* — Terry C Buse
(74) *Attorney, Agent, or Firm* — Thomas Horstemeyer, LLP

(57) ABSTRACT

A control system comprises a travel control unit configured to cause a moving body to travel to a designated place designated by a dispatch request, in response to the dispatch request from a user. Interactive communication is performed between the user and the moving body via a mobile terminal held by the user, before the moving body reaches the designated place. Image data in which surroundings of the designated place are captured by an imaging unit is acquired, after the moving body has reached the designated place as a result of the interactive communication. Information that has been transmitted from the user in the interactive communication is evaluated, based on the image data that has been acquired.

13 Claims, 10 Drawing Sheets

(51) Int. Cl.
   *G10L 15/22*  (2006.01)
   *H04W 4/40*   (2018.01)

(56) References Cited

U.S. PATENT DOCUMENTS

| | | | |
|---|---|---|---|
| 2015/0081362 A1* | 3/2015 | Chadwick | G06Q 50/40 |
| | | | 705/7.14 |
| 2015/0134236 A1* | 5/2015 | Ukai | G01C 21/20 |
| | | | 701/410 |
| 2015/0339928 A1* | 11/2015 | Ramanujam | G06Q 10/00 |
| | | | 701/23 |
| 2019/0057696 A1 | 2/2019 | Ogawa | |
| 2020/0334781 A1* | 10/2020 | Xiao | G06Q 30/0282 |
| 2022/0270490 A1* | 8/2022 | Sakurada | G08G 1/096883 |

\* cited by examiner

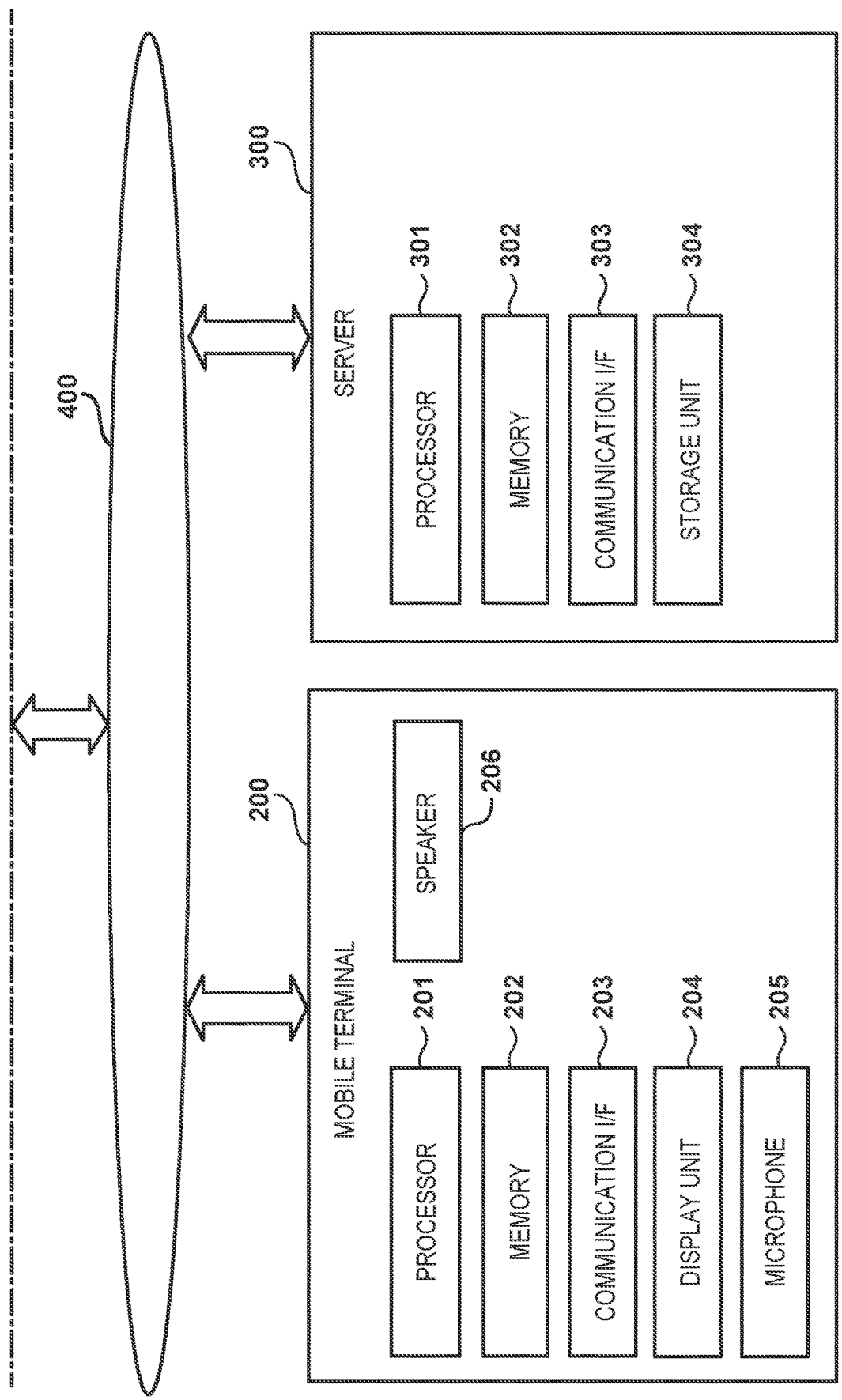

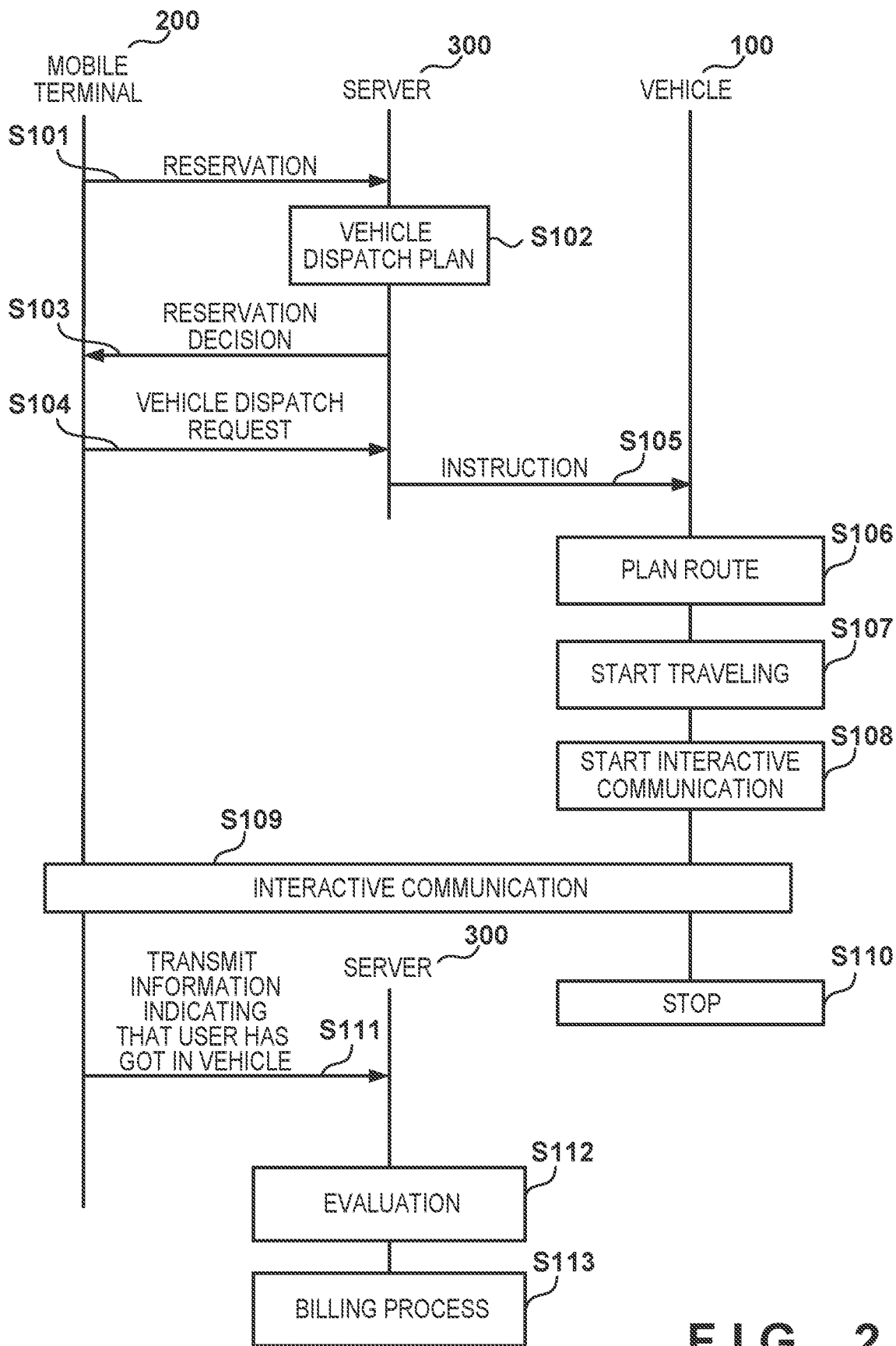
F I G. 2

I am in front of yellow building.

Unfortunately yellow building cannot be found.
Please give us other information.

Sorry for being late,
but now we finally recognize which yellow building is.

CONTROL SYSTEM, CONTROL METHOD, AND STORAGE MEDIUM FOR STORING PROGRAM TO CONTROL THE OPERATION OF A MOBILE DEVICE

BACKGROUND OF THE INVENTION

Field of the Invention

The present invention relates to a control system capable of carrying out interaction with a user, a control method, and a storage medium for storing a program.

Description of the Related Art

A technique for controlling equipment such as a vehicle by voice is conventionally known. Japanese Patent Laid-Open No. 2017-156511 discloses that in a case where a meaning corresponding to a result of voice recognition is ambiguous, ambiguity is resolved, based on a positional relationship or the like between a vehicle and a user. In addition, in a vehicle dispatch service, the technique for controlling the equipment such as the vehicle by voice is also used in interaction between the user who uses such a service and the vehicle.

SUMMARY OF THE INVENTION

However, Japanese Patent Laid-Open No. 2017-156511 does not disclose a mechanism for evaluating transmission information from the user, based on a result of the interaction between the user who uses the dispatch service and the moving body.

The present invention provides a control system for evaluating information that has been transmitted from a user in interactive communication between a user who uses a dispatch service and a moving body, a control method, and a storage medium for storing a program.

The present invention in its first aspect provides a control system comprising: a travel control unit configured to cause a moving body to travel to a designated place designated by a dispatch request, in response to the dispatch request from a user; a communication unit configured to perform interactive communication between the user and the moving body via a mobile terminal held by the user, before the moving body reaches the designated place; an acquisition unit configured to acquire image data in which surroundings of the designated place are captured by an imaging unit, after the moving body has reached the designated place as a result of the interactive communication; and an evaluation unit configured to evaluate information that has been transmitted from the user in the interactive communication, based on the image data that has been acquired by the acquisition unit.

The present invention in its second aspect provides a control method comprising: causing a moving body to travel to a designated place designated by a dispatch request, in response to the dispatch request from a user; performing interactive communication between the user and the moving body via a mobile terminal held by the user, before the moving body reaches the designated place; acquiring image data in which surroundings of the designated place are captured by an imaging unit, after the moving body has reached the designated place as a result of the interactive communication; and evaluating information that has been transmitted from the user in the interactive communication, based on the image data that has been acquired.

The present invention in its third aspect provides a computer-readable storage medium for storing a program to cause a computer to: cause a moving body to travel to a designated place designated by a dispatch request, in response to the dispatch request from a user; perform interactive communication between the user and the moving body via a mobile terminal held by the user, before the moving body reaches the designated place; acquire image data in which surroundings of the designated place are captured by an imaging unit, after the moving body has reached the designated place as a result of the interactive communication; and evaluate information that has been transmitted from the user in the interactive communication, based on the image data that has been acquired.

According to the present invention, it is possible to evaluate the information that has been transmitted from the user in the interactive communication between the user who uses the dispatch service and the moving body.

BRIEF DESCRIPTION OF THE DRAWINGS

FIGS. 1A and 1B are diagrams illustrating a system configuration of a vehicle dispatch service;
FIG. 2 is a diagram illustrating a flow of the vehicle dispatch service.

DESCRIPTION OF THE EMBODIMENTS

Figure 1A:
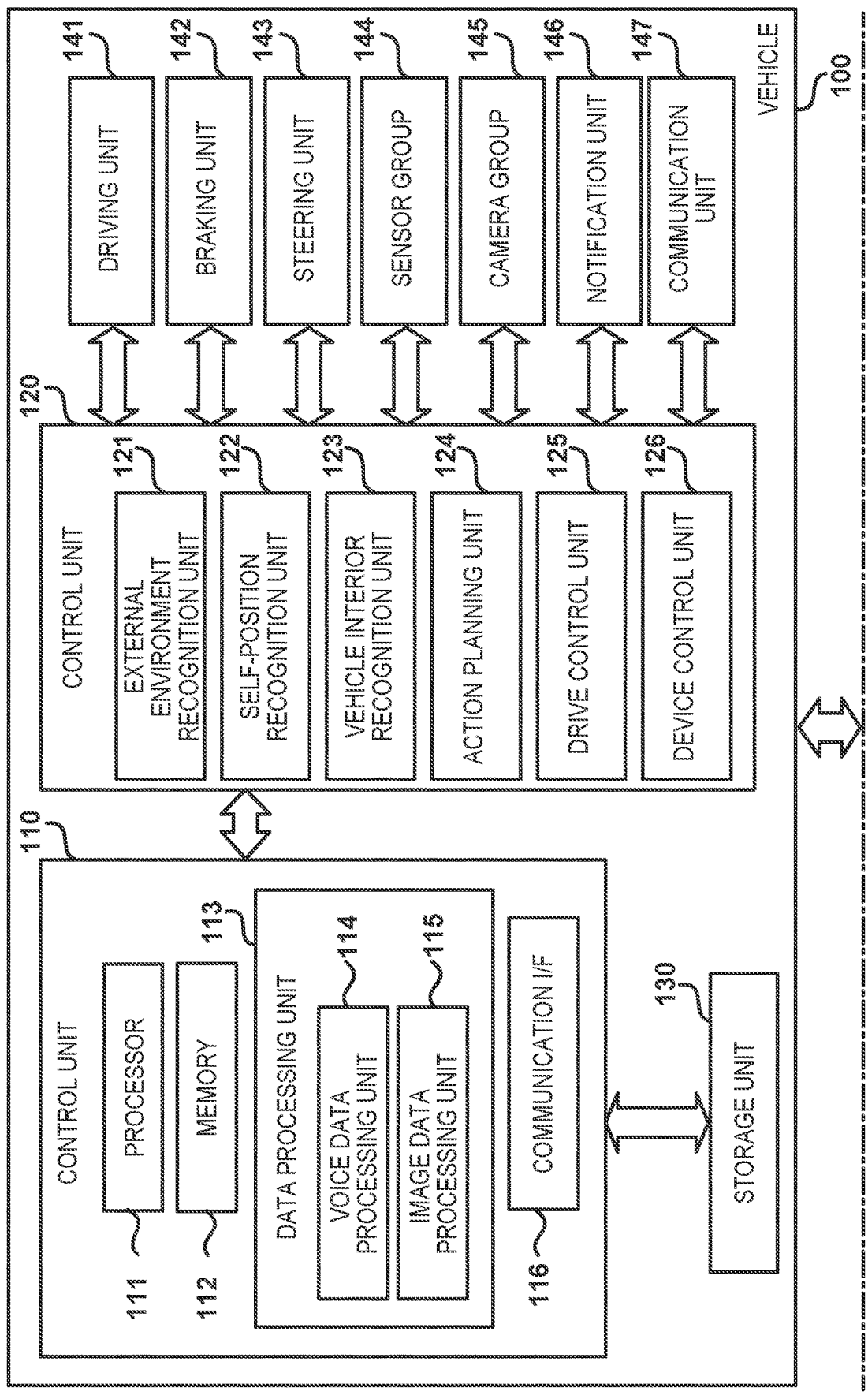

Hereinafter, embodiments will be described in detail with reference to the attached drawings. Note that the following embodiments are not intended to limit the scope of the claimed invention, and limitation is not made an invention that requires all combinations of features described in the embodiments. Two or more of the multiple features described in the embodiments may be combined as appropriate. Furthermore, the same reference numerals are given to the same or similar configurations, and redundant description thereof is omitted.

FIGS. 1A and 1B are diagrams illustrating an example of a system configuration of a vehicle dispatch service in the present embodiment. As illustrated in FIGS. 1A and 1B, the system includes a vehicle 100, a mobile terminal 200 held by a user, and a server 300 that provides a vehicle dispatch service. The user installs an application that enables the user to receive the vehicle dispatch service from the server 300 onto the mobile terminal 200, and registers information (user information) regarding the user in the server 300 via the application. Note that the application may be a web application running on a web browser. On the other hand, the server 300 manages identification information such as a user name and an e-mail address as information that has been registered by the user.

In a state where the user information is registered in the server 300, the user is able to request a dispatch of the vehicle 100 from the mobile terminal 200 via the application while in a city area, for example. The vehicle 100 is, for example, an automated driving vehicle intended for a taxi or ride-sharing, and the user is able to receive the vehicle dispatch service by getting in the dispatched vehicle 100. In addition, the user is billed for the use of the vehicle dispatch service at an appropriate timing such as after the user gets off the vehicle 100.

When the vehicle 100 heads for the requested place in response to a vehicle dispatch request from the user, a conversation (interaction) for the vehicle 100 to reach the requested place (or to find the user) may be made between the vehicle 100 and the user. For example, in response to a question like "Where are you?" from the vehicle 100, the user makes a response "I am at the corner of an intersection". The dispatch time of the vehicle 100 is greatly affected by whether such an interaction is smoothly successful. In a city area, there are many dead angles and there are not a few scenes where many types of landmarks are present in a complicated manner, and in some cases, the interaction is not smoothly successful even though the user is seriously trying to communicate with the vehicle 100 about where the user is. For this reason, in a case where the interaction is not smoothly successful and it takes time to dispatch the vehicle 100, an action is taken to discount a service use fee depending on the case, because the user's intention has not been smoothly recognized. However, on the other hand, other cases are also conceivable where the user intentionally delays the arrival of the vehicle 100 for the purpose of a discount of the use fee.

In the present embodiment, it is possible to increase the possibility of applying discount eligibility for the use fee to a case where the user is seriously trying to communicate with the vehicle 100 about the location of the user, and it is possible to reduce the possibility of applying the discount eligibility for the use fee to a case where the user intentionally delays the recognition of the vehicle 100.

A configuration of the vehicle 100 will be described.

A control unit 120 integrally controls traveling of the vehicle 100, and is achieved by, for example, a plurality of ECUs. Note that the traveling of the vehicle 100 here includes traveling with involvement of the driver of the vehicle 100 and traveling by automated driving without the involvement of the driver.

An external environment recognition unit 121 recognizes external environment information of the vehicle 100, based on signals from an external environment recognition camera and an external environment recognition sensor. Here, the external environment recognition camera is a camera that is included in a camera group 145, and captures images of the surroundings of the vehicle 100. Further, the external environment recognition sensor is included in a sensor group 144, and for example, light detection and ranging (LIDAR) that detects an object in the surroundings of the vehicle 100 and measures a distance to the object. The external environment recognition unit 121 recognizes, for example, scenes such as an intersection, a railroad crossing, and a tunnel, free spaces such as road shoulders, and behaviors (speeds and traveling directions) of other vehicles, based on the signals from the external environment recognition camera and the external environment recognition sensor.

A self-position recognition unit 122 recognizes the current position of the vehicle 100, based on a signal from a GPS sensor included in the sensor group 144.

A vehicle interior recognition unit 123 identifies a passenger of the vehicle 100, and recognizes a state of the passenger, based on signals from a vehicle interior recognition camera and a vehicle interior recognition sensor. The vehicle interior recognition camera is included in the camera group 145, and is, for example, a near-infrared camera installed on a display device included in a notification unit 146. For example, the vehicle interior recognition unit 123 detects the direction of the line of sight of the passenger from the captured image data. In addition, the vehicle interior recognition sensor is included in the sensor group 144, and is, for example, a sensor for detecting a biological signal of the passenger and acquiring biological information. The biological information is, for example, information related to a living body, such as a pulse, a heart rate, a body weight, a body temperature, a blood pressure, sweating, and sleep information. The vehicle interior recognition sensor may be configured to acquire such information related to the living body from, for example, a wearable device of the passenger. The vehicle interior recognition unit 123 recognizes that the passenger is in a dozing state, a state of doing something other than driving, and the like, based on those signals.

An action planning unit 124 plans an action of the vehicle 100, such as an optimal route and a risk avoidance route based on recognition results of the external environment recognition unit 121 and the self-position recognition unit 122. The action planning unit 124 makes an action plan, for example, in accordance with an entry determination based on a start point, an end point, or the like of an intersection, a railroad crossing, or the like, and with prediction results of behaviors of other vehicles. A drive control unit 125 controls a driving unit 141, a braking unit 142, and a steering unit 143, based on the action plan of the action planning unit 124. Here, the driving unit 141 corresponds to, for example, a power plant that outputs driving force for rotating driving wheels of the vehicle 100, and the braking unit 142 corresponds to a brake device. In addition, the steering unit 143 corresponds to an electric power steering device including a mechanism that steers the wheels in accordance with a driver's driving operation (steering operation) on a steering wheel. The electric power steering device includes a motor that assists the steering operation or exerts the driving force for automatically steering the wheels, a sensor that detects a steering angle, and the like. When the driving state of the vehicle 100 is the automated driving, the control unit 120 automatically controls the driving unit 141, the braking unit 142, and the steering unit 143 to control the traveling of the vehicle 100.

A device control unit 126 controls devices connected with the control unit 120. For example, the device control unit 126 causes a speaker and a microphone to output a predetermined voice message such as a warning or a message for navigation, and detects a voice signal that has been uttered by a passenger in the vehicle to acquire voice data. In addition, for example, the device control unit 126 causes the display device included in the notification unit 146 to display a predetermined interface screen. Further, for example, the device control unit 126 controls a navigation device to acquire setting information from the navigation device.

A communication unit 147 is a communication device capable of communicating with the outside, and is capable of wirelessly communicating with, for example, a server that provides map information, traffic information, and weather information, and with other surrounding vehicles. The communication unit 147 has several types of communication functions, for example, a dedicated short range communication (DSRC) function and a cellular communication function.

The control unit 120 may appropriately include any functional block other than those illustrated in FIGS. 1A and 1B, and may include, for example, an optimal route calculation unit that calculates an optimal route to a destination, based on the map information that has been acquired from an external server. Further, the control unit 120 may acquire information from anything other than the camera group 145 and the sensor group 144 illustrated in FIGS. 1A and 1B, and for example, may acquire information of another vehicle via the communication unit 147.

A control unit 110 is provided for achieving an operation of the vehicle 100 in the present embodiment, and the control unit 110, a storage unit 130, and the control unit 120 can communicate with each other. The control unit 110 includes a processor 111, a memory 112, a data processing unit 113, and a communication interface (I/F) 116. The processor 111 integrally controls the control unit 110 by reading and executing a program stored in a computer-readable storage medium such as the memory 112 or the storage unit 130. The operation of the vehicle 100 in the present embodiment is achieved, for example, by the processor 111 executing the above program.

The data processing unit 113 includes a processing unit that processes the voice data and image data that have been received from the mobile terminal 200. A voice data processing unit 114 extracts a feature based on the voice data that has been received from the mobile terminal 200, and performs voice recognition based on its feature amount. The voice data here is, for example, obtained by converting a voice signal that has been uttered by the user toward a microphone 205 of the mobile terminal 200 into communication data. In addition, the voice data processing unit 114 generates voice data notification of which is given to the user of the mobile terminal 200. The voice data generated in such a case includes voice data that conforms to a predetermined format and voice data that has been generated, based on a voice recognition result of the voice data that has been received from the mobile terminal 200. An image data processing unit 115 extracts a feature based on the captured data of an image of the surroundings of the vehicle 100 that has been captured by a camera of the vehicle 100, and performs image recognition based on its feature amount. The data processing unit 113 may include any block other than the voice data processing unit 114 and the image data processing unit 115. For example, a block for processing other types of data used for interactive communication between the user of the mobile terminal 200 and the vehicle 100, such as text data, or a block for generating a user interface screen to be displayed on a display unit 204 of the mobile terminal 200 may be included.

The communication I/F 116 is an interface for achieving communication with other devices through a network 400. For example, the communication I/F 116 achieves the communication with the mobile terminal 200 through the network 400. The storage unit 130 stores a program or the like for implementing the operation in the present embodiment, and stores, for example, a program for transmitting information that has been received from the mobile terminal 200 to the server 300 or a program for conducting the interactive communication between the user of the mobile terminal 200 and the vehicle 100. The vehicle 100 is not limited to the block configuration illustrated in FIGS. 1A and 1B, and can appropriately include another block.

The mobile terminal 200 is, for example, a smartphone or a tablet type information processing terminal, and includes a processor 201 and a memory 202. The operation of the mobile terminal 200 in the present embodiment is implemented, for example, by the processor 201 executing a program stored in the memory 202. The communication I/F 203 is an interface for achieving the communication with other devices through the network 400. The display unit 204 is, for example, a touch panel, and is capable of displaying various user interface screens and accepting user's operations. The microphone 205 receives a voice uttered by the user of the mobile terminal 200. A speaker 206 gives notification by sound to the user of the mobile terminal 200. The mobile terminal 200 is not limited to the block configuration illustrated in FIGS. 1A and 1B, and can appropriately include another block. For example, the mobile terminal 200 may include a camera capable of capturing images of the outside.

The server 300 is configured as a general-purpose information processing apparatus such as a PC, and includes a processor 301, a memory 302, a communication I/F 303, and a storage unit 304. The operation of the server 300 in the present embodiment is implemented, for example, by the processor 301 executing a program stored in the memory 302 or a computer-readable storage medium of the storage unit 304. The communication I/F 303 is an interface for achieving communication with other devices through the network 400. The storage unit 304 stores a program and data for enabling the vehicle dispatch service, an application that can be downloaded by the mobile terminal 200, and the like. For example, operation information and position information of each vehicle to be dispatched are stored as data for enabling the vehicle dispatch service. In addition, the storage unit 304 stores user information that has been registered via equipment corresponding to the user, such as the mobile terminal 200. Further, the storage unit 304 constitutes a database of map information, traffic information, weather information, and the like.

The server 300 is not limited to the block configuration illustrated in FIGS. 1A and 1B, and can appropriately include another block. In addition, although the server 300 is illustrated as one server for the sake of description, it may be configured as a plurality of server apparatuses. Further, a part of the configuration of the server 300 may be included in the vehicle 100. For example, a database such as the map information may be configured in the storage unit 130 of the vehicle 100, or an evaluation process to be described later can be performed by the control unit 110 of the vehicle 100. Furthermore, a part of the configuration of the vehicle 100 may be included in the server 300. For example, the voice data processing unit 114 and the image data processing unit 115 may be configured in the server 300.

FIG. 2 is a diagram illustrating a flow of the vehicle dispatch service in the system configuration of FIGS. 1A and 1B. Before the sequence of FIG. 2 is started, user information of the user of the mobile terminal 200 is registered in the server 300.

In S101, the mobile terminal 200 activates the application for the vehicle dispatch service in the server 300 in accordance with a user instruction, and logs in with a predetermined ID and a password. The application that has been downloaded beforehand from the server 300 may be activated by a click operation or the like, or may be activated by specifying a URL corresponding to the server 300. After the application is activated, the mobile terminal 200 opens a reservation screen on the application in accordance with a user instruction, and makes a reservation for a vehicle dispatch. The reservation for the vehicle dispatch is made like, for example, "B-chome in A city, 15:00, October 20". The address may be designated by the user designating on a map, for example. When reservation information is decided on the application, the mobile terminal 200 transmits the reservation information that has been decided to the server 300.

In S102, upon reception of the reservation information from the mobile terminal 200, the server 300 plans the vehicle dispatch based on the reservation information. In the vehicle dispatch plan of S102, for example, it is determined whether the vehicle dispatch is available at the date and time and the place designated in the reservation information. When it is determined that vehicle dispatch is available in the vehicle dispatch plan, the server 300 determines in S103 the vehicle 100 to be dispatched at the date and time and the place designated in the reservation information, and transmits notification information of the reservation decision to the mobile terminal 200. As the vehicle 100 to be dispatched, for example, a vehicle located at a place closest to the place on the reserved date and time is determined from among a plurality of operable vehicles. In a case where it is determined that the vehicle dispatch is unavailable in the vehicle dispatch plan, the server 300 transmits in S103 notification information indicating that the vehicle dispatch based on the reservation information is unavailable to the mobile terminal 200, and ends the process of FIG. 2. In the following, it is assumed that notification information of the reservation decision is transmitted in S103.

When the user confirms that the mobile terminal 200 has received the notification information of the reservation decision from the server 300, the user goes to the place designated in the reservation information on the date and time designated in the reservation information, and gives the vehicle dispatch request from the mobile terminal 200. Note that in the present embodiment, the equipment used for making the reservation in S101 and the equipment used for giving the vehicle dispatch request in S104 are the identical mobile terminal 200, but may be different. For example, the processes of S101 and S103 may be performed on a PC different from the mobile terminal 200.

In S104, the mobile terminal 200 activates the application of the vehicle dispatch service of the server 300 in accordance with the user instruction as described above, and transmits the vehicle dispatch request to the server 300, on the application screen. In S105, upon reception of the vehicle dispatch request, the server 300 instructs the vehicle 100 determined in S102 to head for the place designated in the reservation information.

In S106, the vehicle 100 that has been instructed from the server 300 plans a route from the current position of the vehicle 100 to the designated place. Note that the vehicle 100 at the time when instructed from the server 300 may be traveling on a road in accordance with a vehicle dispatch service used by another user, or may be on standby for the vehicle dispatch service. In S107, the vehicle 100 starts traveling with the designated place as a destination based on the route planned in S106. In S108, when reaching a predetermined range to the designated destination, the vehicle 100 starts interactive communication with the user in order to arrive at the place where the user is waiting.

In S109, the interactive communication is performed between the user and the vehicle 100. Note that, in the present embodiment, the interactive communication is performed by voice. The interactive communication is divided and performed, for example, in two stages of finding a landmark such as a building in the vicinity of the user and finding the user itself. For example, the user transmits information serving as a landmark such as a building in the vicinity of the user by voice, and the vehicle 100 attempts to find the landmark based on its voice information. In a case where the vehicle 100 cannot find the landmark, the vehicle 100 requests the user to provide more information. On the other hand, in a case where the vehicle 100 has found the landmark, the vehicle 100 notifies the user that the vehicle 100 has found the landmark, and requests the user to provide user's own information. The user tells the user's own information (color of clothes or the like) by voice, and the vehicle 100 attempts to find the user. In a case where the vehicle 100 cannot find the user, the vehicle 100 requests the user to provide more information. On the other hand, in a case where the vehicle 100 has found the user, the vehicle 100 notifies the user that the vehicle 100 has found the user, and stops at a position where the vehicle 100 is allowed to stop, such as a space on a road shoulder (S110).

When the vehicle 100 stops in S110, the user gets in the vehicle 100, and transmits in S111 information indicating that the user has got in the vehicle via the application of the mobile terminal 200 to the server 300. The information indicating that the user has got in the vehicle may be transmitted by a predetermined button being pressed on the application screen. After the user gets in the vehicle 100, traveling to a destination desired by the user is started.

Upon reception of the information indicating that the user has got in the vehicle 100, the server 300 evaluates in S112 the information that has been transmitted from the user in the interactive communication between the user and the vehicle 100. The evaluation in S112 will be described later. In S113, the server 300 bills the user, based on an evaluation result in S112. Further, in the present embodiment, a description will be given that the processes of S112 and S113 are assumed to be performed by the server 300. However, at least one of these processes may be performed by the control unit 110 of the vehicle 100.

Figure 3:
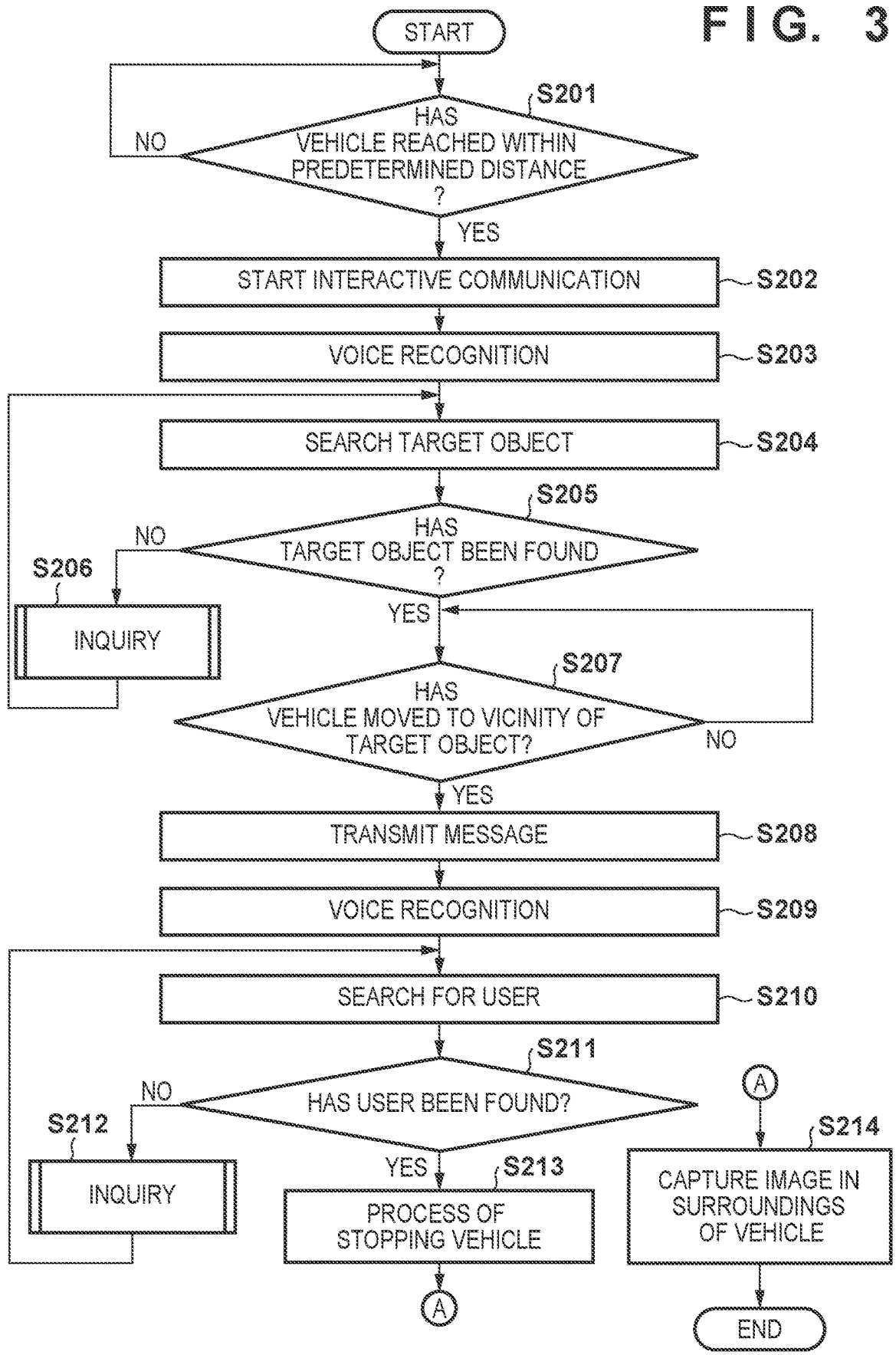
FIG. 3 is a flowchart illustrating an interaction process.

FIG. 3 is a flowchart illustrating a process of the interactive communication in S109. The process of FIG. 3 is implemented, for example, by the processor 111 executing a program stored in the memory 112. The process of FIG. 3 is started, when the vehicle 100 starts traveling in S107 of FIG. 2.

In S201, the processor 111 determines whether the vehicle 100 has reached within a predetermined distance to the place a notification on which has been given from the server 300 in S105. For example, the processor 111 may make the determination based on the route planned in S106, or may make the determination based on whether the vehicle 100 has reached within an area having a radius with its center at the place the instruction on which has been given. In a case where the vehicle 100 has not reached within the predetermined distance, the process of S201 is repeated, and in a case where the vehicle 100 has reached within the predetermined distance, the process proceeds to S202.

In S202, the processor 111 causes the voice data processing unit 114 to start the interactive communication with the user of the mobile terminal 200. For example, the processor 111 generates a voice message like "This vehicle will arrive at the requested place shortly. Please tell us a nearby landmark", which indicates a start message for the interactive communication, and transmits the message to the mobile terminal 200. Note that such a message may be text data, and in the present embodiment, voice data will be described as an example. Upon reception of the notification using the above message, the user of the mobile terminal 200 inputs by voice a feature that can be the landmark in the vicinity of the user into the microphone 205.

Figure 9:
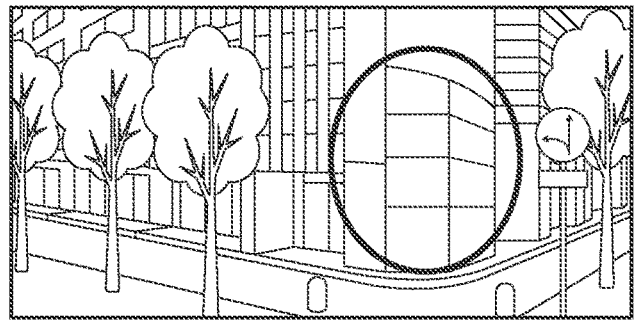
FIG. 9 is a diagram illustrating an example of interaction.
Figure 9:
Figure 9:
Figure 9:
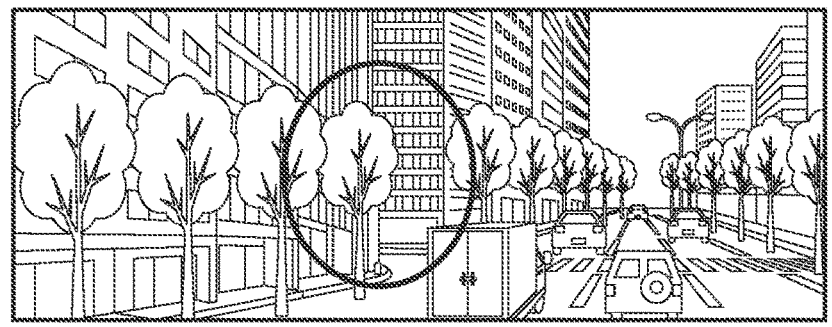
Figure 9:
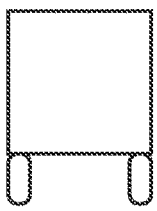
Figure 9:
Figure 9:
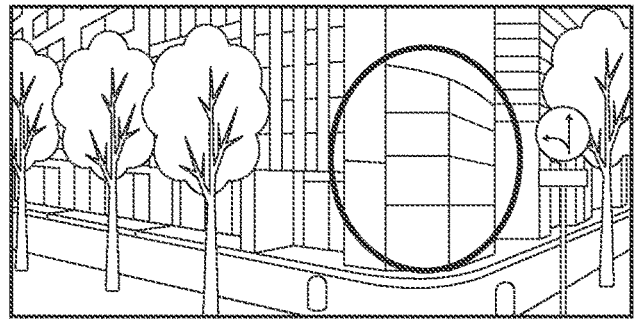
Figure 9:
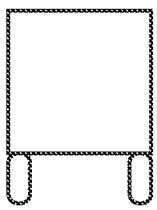

The top part of FIG. 9 illustrates an example of a message that has been input by the user into the microphone 205. For example, when the user is standing in front of a yellow building, the user inputs by voice "I am in front of a yellow building" into the microphone 205. The processor 201 of the mobile terminal 200 transmits voice signals that have been input, as voice data, to the vehicle 100.

In S203, the processor 111 causes the voice data processing unit 114 to extract a feature of the voice data that has been received via the communication I/F 116, and performs the voice recognition based on its feature amount. For example, "yellow building" is extracted as a feature from the voice data representing the user's voices. The feature that has been extracted here is stored in the memory 112 and used in the evaluation process of S112.

In S204, the processor 111 causes the image data processing unit 115 to search for a target object representing the feature based on the feature extracted in S203. The processor 111 searches for an object having the feature as a target object candidate, based on image data of the surroundings that have been captured by the camera group 145 of the vehicle 100.

In S205, the processor 111 determines whether the target object has been found. In S205, in a case where one target object candidate has been searched for, the processor 111 determines that the target object candidate has been found, whereas in a case where a plurality of target object candidates have been searched for or the target object has not been searched for, the processor 111 determines that the target object candidate has not been found. Such a determination may be made by another method. For example, even if the plurality of target object candidates are searched for, in a case where those target object candidates are close to each other, they may be regarded as one and determined to have been found. In the case where it is determined in S205 that the target object has been found, the process proceeds to S207, and in the case where it is determined that the target object has not been found, the process proceeds to S206.

In S206, the processor 111 causes the voice data processing unit 114 to generate a message indicating an inquiry about the target object, and transmits the message to the mobile terminal 200.

Figure 4:
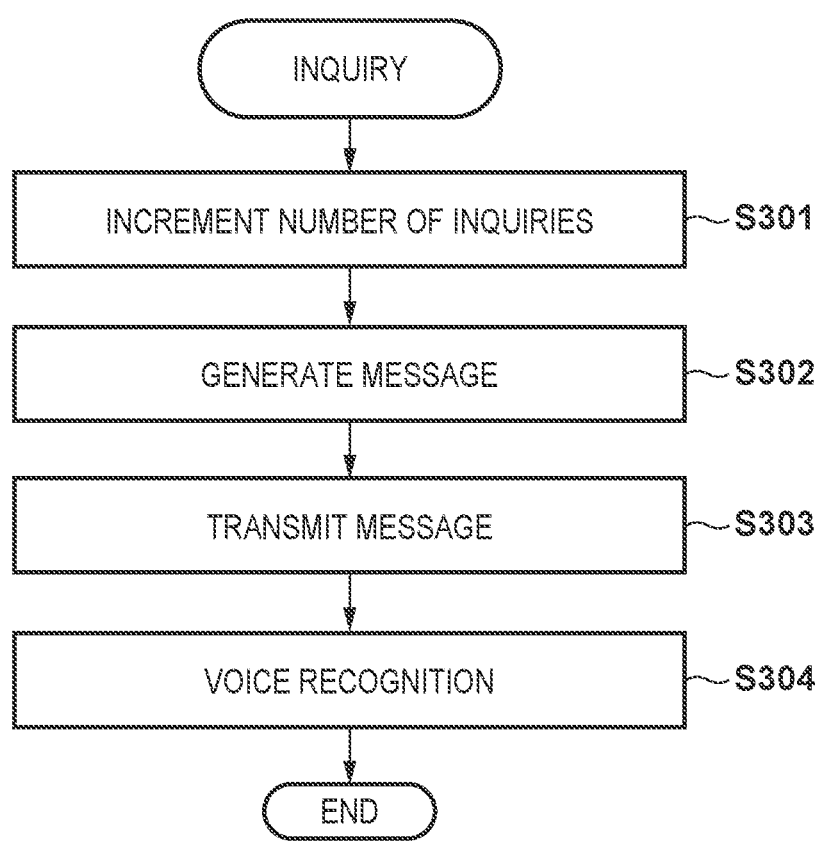
FIG. 4 is a flowchart illustrating an inquiry process.

FIG. 4 is a flowchart illustrating an inquiry process of S206. Before the process of FIG. 4 starts, a variable indicating the number of times the process of S206 is performed (the number of inquiries) is held in the memory 112, and is initialized to 0. In S301, the processor 111 increments the number of inquiries. In a case where No is determined in S205 and the process of S206 is performed first, the number of inquiries is incremented to "1".

In S302, the processor 111 causes the voice data processing unit 114 to generate a message indicating an inquiry about the target object.

The middle part of FIG. 9 illustrates an example of an inquiry. In S205, in a case where an object having the feature "yellow building" cannot be recognized in the image data of the surroundings that have been captured by the camera group 145, a message indicating an inquiry about the target object is generated. As such a message, for example, a message like "Unfortunately the yellow building cannot be found. Please give us other information" is generated. Note that in S205, also in a case where a plurality of objects each having the feature "yellow building" have been searched for in the image data, the above message is generated.

In S303, the processor 111 transmits the message generated in S302 to the mobile terminal 200.

Upon reception of the notification using the above message, the user of the mobile terminal 200 inputs by voice a feature that can be another landmark in the vicinity of the user into the microphone 205. When notification of the message like "Unfortunately the yellow building cannot be found. Please give other information" is given to the user of the mobile terminal 200, the user inputs by voice "The yellow building is located at an intersection" into the microphone 205. The processor 201 of the mobile terminal 200 transmits voice signals that have been input, as voice data, to the vehicle 100.

In S304, the processor 111 causes the voice data processing unit 114 to extract a feature of the voice data that has been received via the communication I/F 116, and performs the voice recognition based on its feature amount. For example, "intersection" is extracted as a feature from the voice data representing the user's voices. The feature amount that has been extracted here is stored in the memory 112 and used in the evaluation process of S112.

After S304, the process of FIG. 4 ends, and repeats the process from S204 of FIG. 3. In the above example, in a case where the process proceeds from S206 to S204, a target object representing the feature is searched for based on the feature "intersection" extracted in S304, and the determination in S205 is made. In a case where it is determined in S205 that the target object has been found, the processor 111 requests the control unit 120 to move the vehicle 100 to the vicinity of the target object.

In S207, the processor 111 determines whether the vehicle 100 has moved to the vicinity of the target object. The determination in S207 is repeated until it is determined that the vehicle 100 has moved to the vicinity of the target object. When it is determined that the vehicle 100 has moved to the vicinity of the target object, the process proceeds to S208.

In S208, the processor 111 causes the voice data processing unit 114 to generate a message indicating that the vehicle 100 has moved to the vicinity of the target object, and transmits the message to the mobile terminal 200. For example, the processor 111 may generate a message like "This vehicle has arrived at the yellow building. Please tell us how to identify you". In addition, the message generated in the case where the vehicle 100 has moved to the vicinity of the target object without the inquiry process of S206 and the message generated in the case where the vehicle 100 has moved to the vicinity of the target object through the inquiry process of S206 may be different from each other. For example, in the case where the vehicle 100 has moved to the vicinity of the target object through the inquiry process of S206, a message like "Sorry for being late, but now we finally recognize which the yellow building is" and a message that "Please tell us how to identify you" as illustrated in the lower part of FIG. 9 may be generated.

Upon reception of the notification using the above message, the user of the mobile terminal 200 inputs by voice a feature of the user's own into the microphone 205. For example, the user inputs by voice "I am wearing blue clothes" into the microphone 205. The processor 201 of the mobile terminal 200 transmits voice signals that have been input, as voice data, to the vehicle 100. In S209, the processor 111 causes the voice data processing unit 114 to extract a feature of the voice data that has been received via the communication I/F 116, and performs the voice recognition based on its feature amount. For example, "blue clothes" is extracted as a feature from the voice data representing the user's voices. The feature that has been extracted here is stored in the memory 112 and used in the evaluation process of S112.

In S210, the processor 111 causes the image data processing unit 115 to search for a user representing the feature based on the feature extracted in S209. The processor 111 searches for an object having the feature as a target object candidate, based on image data of the surroundings that have been captured by the camera group 145 of the vehicle 100.

In S211, the processor 111 determines whether the user has been found. In a case where it is determined in S211 that the user has been found, the process proceeds to S213, and in a case where it is determined that the user has not been found, the process proceeds to S212.

The inquiry process of S212 will be described with reference to FIG. 4. Note that the number of inquiries up to the present time is stored in a variable area held in the memory 112.

In S301, the processor 111 increments the number of inquiries. In S302, the processor 111 causes the voice data processing unit 114 to generate a message indicating an inquiry about the user. For example, a message like "Please tell us another way to identify you" is generated.

In S303, the processor 111 transmits the message generated in S302 to the mobile terminal 200.

Upon reception of the notification using the above message, the user of the mobile terminal 200 inputs by voice another feature into the microphone 205. For example, the user inputs by voice "I have a brown bag" into the microphone 205. At that time, a feature of a nearby object may be input instead of the user's own feature. For example, the user may input by voice "I am beside a utility pole" into the microphone 205. The processor 201 of the mobile terminal 200 transmits voice signals that have been input, as voice data, to the vehicle 100.

In S304, the processor 111 causes the voice data processing unit 114 to extract a feature of the voice data that has been received via the communication I/F 116, and performs the voice recognition based on its feature amount. For example, "brown bag" is extracted as a feature from the voice data representing the user's voice. The feature that has been extracted here is stored in the memory 112 and used in the evaluation process of S112.

After S304, the process of FIG. 4 ends, and repeats the process from S210 of FIG. 3. In the above example, when the process proceeds from S212 to S210, a target object representing the feature is searched for, based on the feature "brown bag" extracted in S304, and the determination in S211 is made. Note that, at the time when the process of S210 is performed, it is hardly assumed that the user is present at a position to be in a dead angle from the vehicle 100. Therefore, in S206, the determination may be made without use of the features accumulated in the memory 112.

In a case where it is determined in S211 that the user has been found, the processor 111 requests in S213 the control unit 120 to stop the vehicle 100 in the vicinity of the user. The process of stopping the vehicle 100 in S213 corresponds to S110 of FIG. 2. The processor 111 stores the stop time of the vehicle 100 in the memory 112.

In S214, the processor 111 requests the control unit 120 to cause the camera group 145 to capture images in the surroundings of the vehicle 100. The image data captured in S214 is stored in a storage area in the storage unit 130 or the like, and is used in the evaluation process of S112. Therefore, the images are captured for 360 degrees around the vehicle 100. After S214, the process of FIG. 3 ends.

Figure 5:
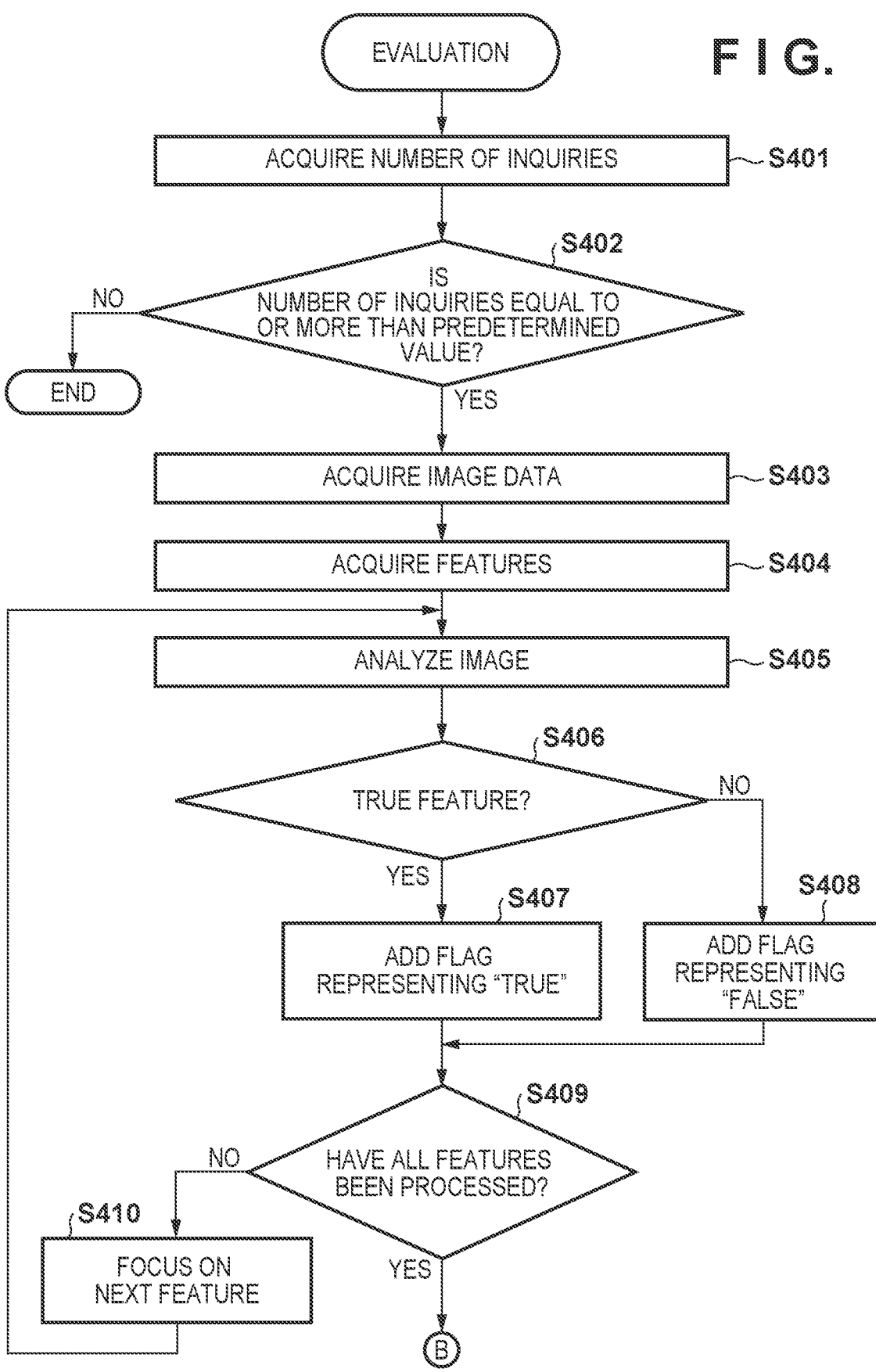
FIG. 5 is a flowchart illustrating an evaluation process.
Figure 6:
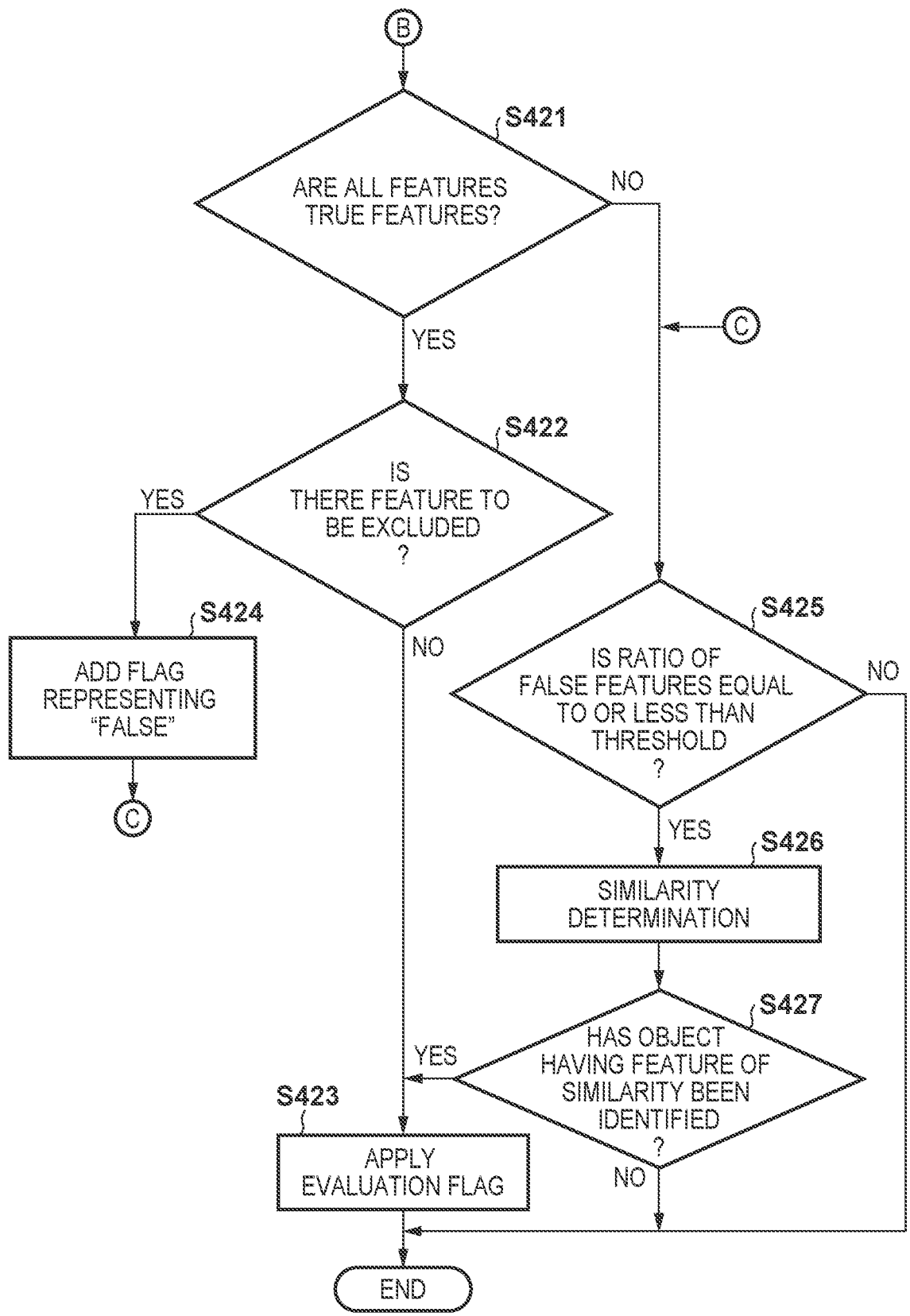
FIG. 6 is a flowchart illustrating the evaluation process.

Next, the evaluation process of S112 will be described. FIGS. 5 and 6 are flowcharts illustrating the evaluation process of S112. The process of FIGS. 5 and 6 is implemented, for example, by the processor 301 of the server 300 executing a program stored in the memory 302.

In S401, the processor 301 acquires the number of inquiries stored in the memory 112 from the vehicle 100. In S402, the processor 301 determines whether the number of inquiries is equal to or more than a predetermined value. In a case where it is determined that it is not equal to or more than the predetermined value, the process of FIGS. 5 and 6 ends, and a billing process of S113 is performed. Note that, in the billing at that time, a fee for a user who is registered in the server 300 in usually using the vehicle dispatch service is applied. On the other hand, in a case where it is determined that the number of inquirise is equal to or more than the predetermined value, the process proceeds to S403.

In S403, the processor 301 acquires the image data acquired in S214 of FIG. 3 from the vehicle 100. Then, in S404, the processor 301 acquires the features stored in the memory 112 from the vehicle 100. The features here are the features extracted in S203, S209, and S304.

In S405, the processor 301 focuses on one of the features acquired in S404, and analyzes whether such one feature corresponds to the feature of the object identified in the image data acquired in S403. Then, in S406, the processor 301 determines whether the feature focused on in S405 is a true feature. For example, in a case where an object having a feature "yellow building" is identified in the image data, the feature is determined to be a true feature. In such a case, in S407, the processor 301 adds a flag representing "true" to the feature. On the other hand, for example, in a case where the object having the feature "yellow building" is not identified in the image data, it is determined that the feature is a false feature amount. In such a case, in S408, the processor 301 adds a flag representing "false" to the feature. After S407 and S408, the process proceeds to S409.

In S409, the processor 301 determines whether the processes of S405 to S408 have been performed for all the features acquired in S404. In a case where it is determined that the processes have not been performed for all the features, the processor 301 in S410 focuses on the next feature and repeats the process from S405. On the other hand, in a case where it is determined that the processes have been performed for all the features, the process proceeds to S421 in FIG. 6.

In S421, the processor 301 determines whether all the features processed in S405 to S408 are true features. For example, the processor 301 determines whether the flag representing "true" is added to all the features. In a case where it is determined that the flag representing "true" is added to all the features, the process proceeds to S422. On the other hand, in a case where it is determined that the flag representing "true" is not added to all the features, that is, in a case where it is determined that there is a feature to which a flag representing "false" is added, the process proceeds to S425.

In S422, the processor 301 determines whether there is a feature to be excluded. Here, the feature to be excluded is a feature amount with which it is possible to determine that an object that has been identified is not obviously present in the place designated in the reservation information, even if the object having the feature that has been extracted in the interactive communication has been identified in the image data. For example, it is assumed that the place designated in the reservation information is a city area. Then, in a case where the identified object is a mountain that is distant and can be seen above, the feature is recognized as the feature to be excluded. For example, the processor 301 refers to the map information configured as a database in the storage unit 304, and estimates the position of an object having a feature to which the flag representing "true" is added. Then, in a case where a condition that an estimated position is away from the place designated in the reservation information by a predetermined distance is satisfied, the processor 301 adds the flag representing "false" to the feature in S424. After S424, the process proceeds to S425. In a case where it is determined in S422 that there is no feature to be excluded, the process proceeds to S423.

In S423, the processor 301 applies an evaluation flag to the user of the mobile terminal 200. The evaluation flag here is a flag representing that the user is eligible for a discount. After S423, the process of FIGS. 5 and 6 ends, and the billing process of S113 is performed.

As described above, in the case where a predetermined number of inquiries or more are made in the interactive communication, and all the features extracted from the voice data of the user of the mobile terminal 200 correspond to the features of the object identified in the image data, the user is eligible for a discount. For example, in a case where the user has given the vehicle dispatch request in a complicated place in the city area, it is conceivable that there are cases where various confusing landmarks or many dead angles are present around the user. Even in such cases, when the user tries to convey the user's own location seriously, all the features that the user is trying to convey are to be identified (in other words, matched) in the image data of the surroundings of the location where the user has given the vehicle dispatch request. In the present embodiment, in such cases, it is determined that the user is highly serious, and the user can be eligible for a discount. In addition, it is possible to exclude, from discount eligibility, a case where the user intentionally tells a feature of something that is not seen from the place where the user has given the vehicle dispatch request or something that is clearly away from the place even if it can be seen from the place where the user has given the vehicle dispatch request.

In S425, the processor 301 determines whether the ratio of the features to each of which the flag representing "false" is added with respect to the features on which the process has been performed in S405 to S408 is equal to or less than a threshold. In a case where it is determined that the ratio is not equal to or less than the threshold, the process of FIGS. 5 and 6 ends. That is, in such a case, the user is not eligible for a discount. In a case where it is determined in S425 that the ratio of the features to each of which the flag representing "false" is added is equal to or less than the threshold, the process proceeds to S426.

In S426, the processor 301 makes a similarity determination on the feature to which the flag representing "false" is added. For example, the processor 301 analyzes whether an object whose feature amount of the feature to which the flag representing "false" is added falls within a predetermined range is identified in the image data. Then, in S427, the processor 301 determines whether an object having a feature of similarity to the feature to which the flag representing "false" is added has been identified. In a case where the object having the feature of similarity has been identified, an evaluation flag is given to the user of the mobile terminal 200 in S423. It is determined that there is a similarity in, for example, shape between a circle and an ellipse each having a curvature within a predetermined range. In addition, it is determined that there is a similarity in, for example, chromaticity, in which chroma or luminance falls within a predetermined range.

For example, in a situation in which there are various confusing landmarks in the surroundings of the user, there is a possibility that the user mistakes one thing for another. In the present embodiment, in consideration of such a case, even if there are a certain number of features to each of which the flag representing "false" is added, when the similarity is recognized, it is determined that the user is highly serious, and the user can be eligible for a discount.

In a case where no object having a similarity is identified in S427, the process of FIGS. 5 and 6 ends. That is, in such a case, the user is not eligible for a discount.

In S425, the description has been given that even if there are a certain number of features to each of which the flag representing "false" is added, when the similarity is recognized, it is determined that the user is highly serious, and the user can be eligible for a discount. Here, the threshold of S425 may be changed depending on the number of times that the evaluation flag has been given.

Figure 8:
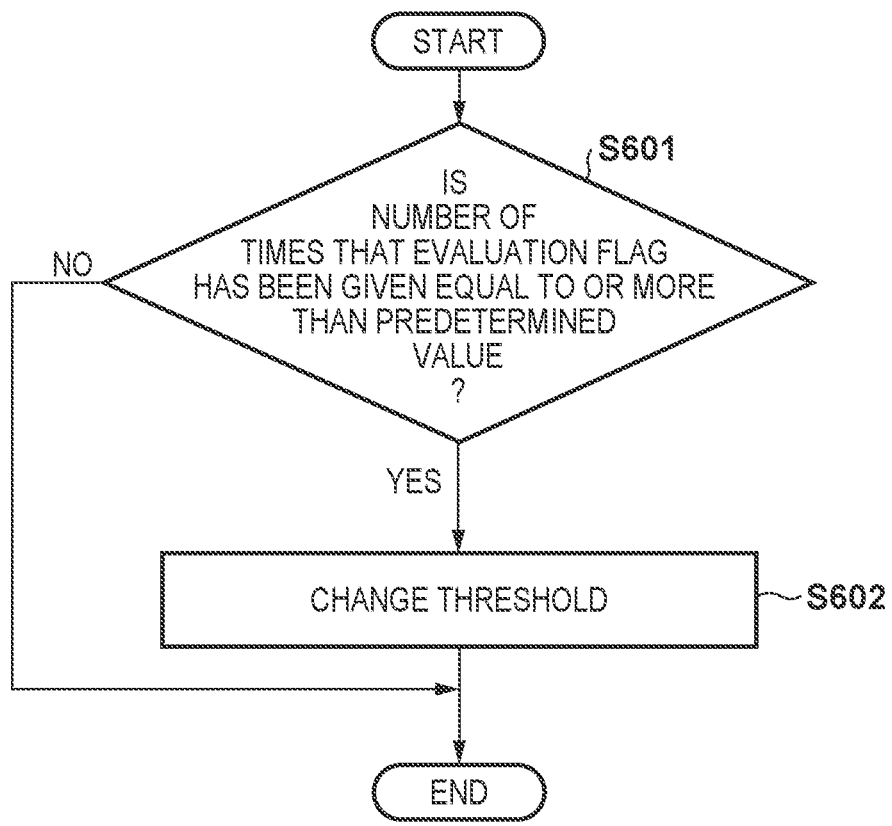
FIG. 8 is a flowchart illustrating a process of changing a threshold in S425.

FIG. 8 is a flowchart illustrating a process of changing the threshold of S425 in accordance with the number of times that the evaluation flag has been given. The process of FIG. 8 is implemented, for example, by the processor 301 reading and executing a program stored in the memory 302. The process of FIG. 8 is performed, for example, after the evaluation of S112 is carried out. In addition, the server 300 accumulates the number of times that the evaluation flag has been given, as user information stored in the storage unit 304.

In S601, the processor 301 determines whether the number of times that the evaluation flag has been given for the user is equal to or more than a predetermined value. In a case where it is determined that the value is not equal to or more than the predetermined value, the process of FIG. 8 ends. On the other hand, in a case where it is determined that the value is equal to or more than the predetermined value, the process proceeds to S602.

In S602, the processor 301 increases the threshold used in S425 by a predetermined amount. After S602, the process of FIG. 8 ends. In this manner, it is possible to increase the possibility of applying the discount eligibility of the user who is noticeably serious.

Figure 7:
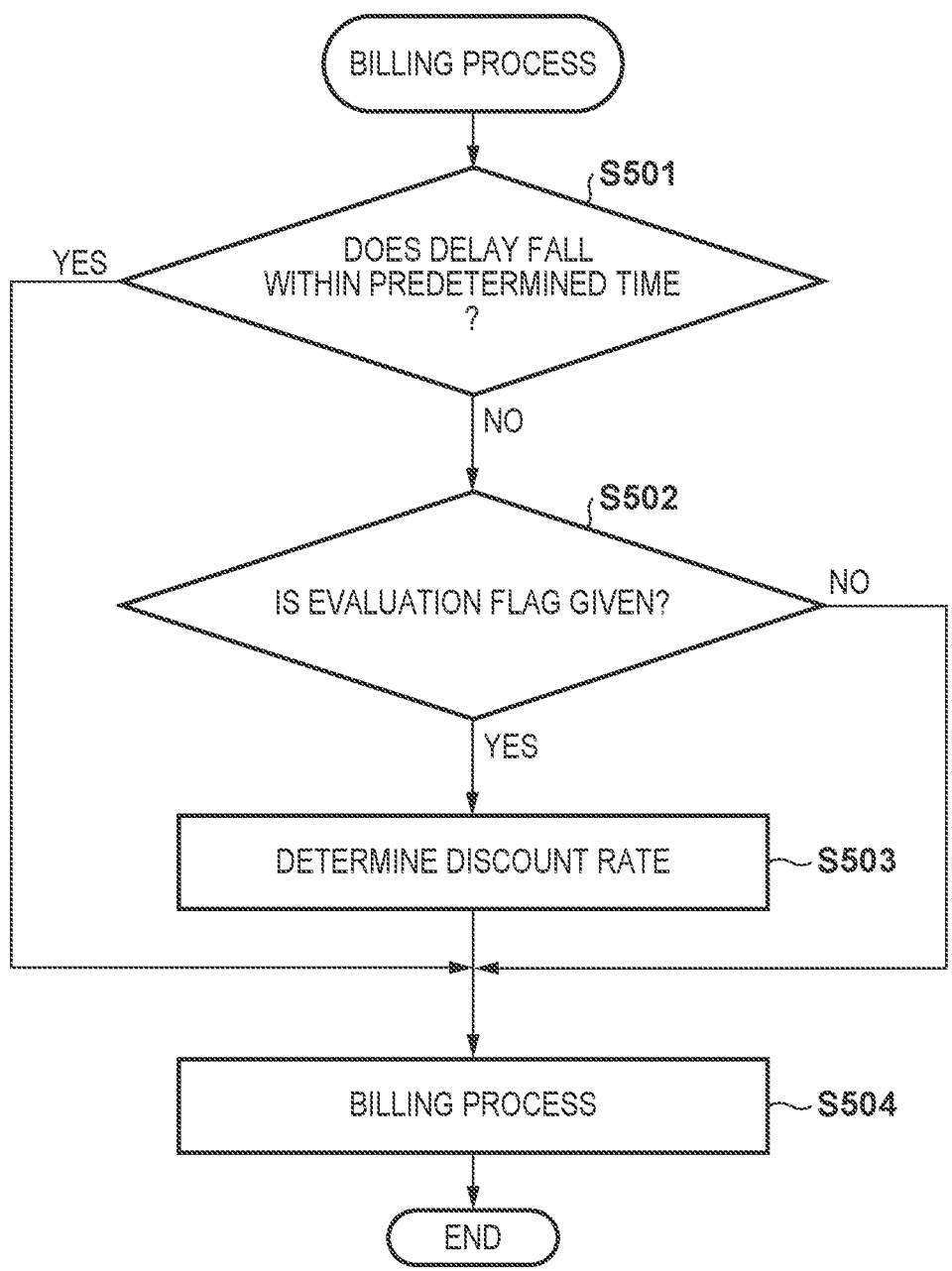
FIG. 7 is a flowchart illustrating a billing process.

FIG. 7 is a flowchart illustrating the billing process of S113. The process of FIG. 7 is implemented, for example, by the processor 301 executing a program stored in the memory 302.

In S501, the processor 301 acquires, from the vehicle 100, the time when the vehicle stops in S213 as the time when the vehicle arrives at the place designated in the reservation information. Then, in a case where the time that has been acquired from the vehicle 100 is the time designated in the reservation information or later, the processor 301 determines whether such a delay falls within a predetermined time. In a case where it is determined that the delay falls within the predetermined time, the process proceeds to S504, and the billing process is performed. For example, in a case where the delay falls within the predetermined time in consideration of the traffic situations and the like, normal billing is performed without the discount eligibility in the present embodiment. On the other hand, in a case where it is determined that the delay does not fall within the predetermined time, the process proceeds to S502.

In addition, a condition for the determination in S501 may be set as follows. For example, in the case where it is determined in S201 of FIG. 3 that the vehicle 100 has reached within the predetermined distance, the processor 111 stores the time in the memory 112 or the like. In such a situation, the processor 111 may estimate an arrival time (or required time) from the position of the vehicle 100 at that time to the designated place, based on route information or traffic information. Then, it is determined in S501 that whether a difference between an estimated time and the actual arrival time stored in S213 is a delay within the predetermined time. In a case where the difference is not the delay within the predetermined time, the process may proceed to S502. Further, in the above configuration, upon reception of the instruction in S105, the processor 111 may estimate the arrival time from the position of the vehicle 100 at that time to the designated place, based on the route information or the traffic information.

In S502, the processor 301 determines whether the evaluation flag is given to the user of the mobile terminal 200 in S423. In a case where it is determined that the evaluation flag is not given, the process proceeds to S504, and the billing process is performed. That is, in such a case, the user is not eligible for a discount, and the normal billing is performed. On the other hand, in a case where it is determined that the evaluation flag is given, the process proceeds to S503.

In S503, the processor 301 determines a discount rate for the user of the mobile terminal 200. The discount rate here may be a predetermined discount rate, or the discount rate may be changed depending on the number of times that the evaluation flag has been given. For example, in a case where the number of times that the evaluation flag has been given is equal to or more than a predetermined number of times, the discount rate may be increased. In addition, a plurality of stages may be provided for the predetermined number of times, and the discount rate may be increased as the number of times that the evaluation flag has been given increases.

In S504, the processor 301 performs the billing process for the user of the mobile terminal 200. For example, as the billing process, a notification of a billing amount is transmitted to the e-mail address of the user. In addition, in a case where the discount rate is determined in S503, the discount rate is applied to the billing process. After S504, the process of FIG. 7 ends.

As described heretofore, according to the present embodiment, the user's seriousness in the interactive communication of the vehicle dispatch service is determined. Then, a discount is given based on its determination result. With such a configuration, it is possible to appropriately narrow down users to be eligible for a discount, in the case where the delay of the vehicle 100 is equal to or more than a predetermined time. Further, in the present embodiment, the description has been given with regard to the discount rate that is determined in S503. However, any process other than the determination of the discount rate may be applicable. For example, a process of increasing the priority of the vehicle dispatch request next time may be applicable.

In the present embodiment, the vehicle 100 has been described as an automated driving vehicle. However, the vehicle 100 is not limited to the automated driving vehicle. For example, a micro-mobility or autonomous mobile robot on which no occupant is on board may be used as the vehicle 100. Even with such a configuration, the same effect as the in the present embodiment is obtained.

Summary of Embodiments

The control system of the above embodiment is A control system comprising: a travel control unit (120) configured to cause a moving body to travel to a designated place designated by a dispatch request, in response to the dispatch request from a user; a communication unit (110) configured to perform interactive communication between the user and the moving body via a mobile terminal held by the user, before the moving body reaches the designated place; an acquisition unit (110, 145) configured to acquire image data in which surroundings of the designated place are captured by an imaging unit, after the moving body has reached the designated place as a result of the interactive communication; and an evaluation unit (300) configured to evaluate information that has been transmitted from the user in the interactive communication, based on the image data that has been acquired by the acquisition unit.

With such a configuration, it is possible to evaluate the information that has been transmitted from the user in the interactive communication.

The control system further comprises a recognition unit (113) configured to recognize the information that has been transmitted from the user, based on data that has been received from the mobile terminal. The recognition unit recognizes the information that has been transmitted from the user, based on voice data that has been received from the mobile terminal.

With such a configuration, it is possible to evaluate voice information that has been transmitted from the user in the interactive communication.

The evaluation unit evaluates the information that has been transmitted from the user, based on a match between the information that has been transmitted from the user and information that has been extracted from the image data. The evaluation unit evaluates the information about whether to give a discount in a billing process to the user. (FIG. 5, FIG. 6)

With such a configuration, it is possible to evaluate whether the user is eligible for a discount, based on the information that has been transmitted from the user in the interactive communication.

The information is information representing a feature, and the evaluation unit evaluates the information to give the discount in the billing process, in a case where all of features that have been transmitted from the user match features that have been extracted from the image data. (FIG. 5, FIG. 6) The evaluation unit evaluates the information to give the discount in the billing process, in a case where a ratio of features that have been transmitted from the user matching features that have been extracted from the image data is equal to or larger than a threshold. (FIG. 5, FIG. 6)

With such a configuration, it is possible to evaluate the information that has been transmitted from the user, based on the captured image of the surroundings, when the moving body arrives at the designated place.

If a feature that does not match among the features that have been transmitted from the user has a similarity to a feature that has been extracted from the image data, the evaluation unit evaluates the information to give the discount in the billing process. (FIG. 6) The evaluation unit further determines whether the feature that does not match among the features that have been transmitted from the user has a similarity to the feature that has been extracted from the image data, and the evaluation unit evaluates the information to give the discount in the billing process, based on a result of the determination. The similarity includes at least one of a shape or a color.

With such a configuration, it is possible to carry out an evaluation in consideration that the user mistakes one thing for another.

The control system further comprises: a storage unit configured to accumulate the number of times that the evaluation unit has evaluated the information to give the discount in the billing process; and a change unit configured to change the threshold, in a case where the number of times is equal to or larger than a predetermined value.

With such a configuration, it is possible to improve a motivation for conveying information accurately.

The evaluation unit evaluates the information, in a case where an arrival of the moving body at the designated place satisfies a condition. The condition includes the arrival of the moving body at the designated place being delayed from a required time that has been estimated. The required time is estimated, based on a position of the moving body and the designated place.

With such a configuration, in a case where the moving body is delayed and arrives at the designated place, it is possible to evaluate the information that has been transmitted from the user.

The control system is configured in the moving body.

With such a configuration, in the moving body, it is possible to construct a system for evaluating the information that has been transmitted from the user in the interactive communication.

The invention is not limited to the foregoing embodiments, and various variations/changes are possible within the spirit of the invention.

What is claimed is:

1. A control system including a moving body and a server comprising:
    at least one processor and a memory of the moving body comprising instructions, that when executed by the processor, causing the processor to at least:
    cause the moving body to travel to a designated place designated by a dispatch request, in response to the dispatch request from a user;
    perform interactive communication between the user and the moving body via a mobile terminal held by the user, before the moving body reaches the designated place;
    acquire image data in which surroundings of the designated place are captured by an imaging unit, after the moving body has reached the designated place as a result of the interactive communication; and
    at least one processor and a memory of the server comprising instructions, that when executed by the processor, causing the processor to at least:
    evaluate information that has been transmitted from the user in the interactive communication, based on the image data that has been acquired, wherein
    the information that has been transmitted from the user is evaluated based on a match between the information that has been transmitted from the user and information that has been extracted from the image data,
    the information is evaluated about whether to give a discount in a billing process to the user, and
    the information is evaluated to give the discount in the billing process, in a case where a ratio of features that have been transmitted from the user matching features that have been extracted from the image data is equal to or larger than a threshold.

2. The control system according to claim 1, wherein the at least one processor and the memory of the moving body comprising the instructions, when executed by the processor, further cause the processor to at least: recognize the information that has been transmitted from the user, based on data that has been received from the mobile terminal.

3. The control system according to claim 2, wherein the information that has been transmitted from the user is recognized based on voice data that has been received from the mobile terminal.

4. The control system according to claim 1, wherein, if a feature that does not match among the features that have been transmitted from the user has a similarity to a feature that has been extracted from the image data, the information is evaluated to give the discount in the billing process.

5. The control system according to claim 4, wherein the at least one processor and the memory of the moving body comprising the instructions, when executed by the processor, further cause the processor to at least:
    determine whether the feature that does not match among the features that have been transmitted from the user has a similarity to the feature that has been extracted from the image data, and
    evaluate the information to give the discount in the billing process, based on a result of the determination.

6. The control system according to claim 4, wherein the similarity includes at least one of a shape or a color.

7. The control system according to claim 1, wherein the at least one processor and the memory of the moving body comprising the instructions, when executed by the processor, further cause the processor to at least:
    accumulate the number of times that the the information has been evaluated to give the discount in the billing process; and
    change the threshold, in a case where the number of times is equal to or larger than a predetermined value.

8. The control system according to claim 1, wherein the evaluation unit evaluates the information is evaluated in a case where an arrival of the moving body at the designated place satisfies a condition.

9. The control system according to claim 8, wherein the condition includes the arrival of the moving body at the designated place being delayed from a required time that has been estimated.

10. The control system according to claim 9, wherein the required time is estimated, based on a position of the moving body and the designated place.

11. The control system according to claim 1, wherein the control system is configured in the moving body.

12. A control method comprising:
    causing a moving body to travel to a designated place designated by a dispatch request, in response to the dispatch request from a user;
    performing interactive communication between the user and the moving body via a mobile terminal held by the user, before the moving body reaches the designated place;
    acquiring image data in which surroundings of the designated place are captured by an imaging unit, after the moving body has reached the designated place as a result of the interactive communication; and
    evaluating information that has been transmitted from the user in the interactive communication, based on the image data that has been acquired;
    wherein the information that has been transmitted from the user is evaluated based on a match between the information that has been transmitted from the user and information that has been extracted from the image data,
    the information is evaluated about whether to give a discount in a billing process to the user, and
    the information is evaluated to give the discount in the billing process, in a case where a ratio of features that have been transmitted from the user matching features that have been extracted from the image data is equal to or larger than a threshold.

13. A computer-readable storage medium for storing a program to cause a computer to:
    evaluate information that has been transmitted from a user in an interactive communication between the user and a moving body via a mobile terminal held by the user performed before the moving body reaches a designated place designated by a dispatch request, in response to the dispatch request from the user, based on the image data that has been acquired in which surroundings of the designated place are captured by an imaging unit, after the moving body has reached the designated place as a result of the interactive communication, wherein the information that has been transmitted from the user is evaluated, based on a match between the information that has been transmitted from the user and information that has been extracted from the image data, the information about whether to give a discount in a billing process to the user is evaluated, and the information to give the discount in the billing process is evaluated, in a case where a ratio of features that have been transmitted from the user matching features that have been extracted from the image data is equal to or larger than a threshold.

* * * * *